Dec. 23, 1952  A. L. MATTE  2,623,123
CARRIER TELEGRAPH SYSTEM
Filed Feb. 10, 1950  5 Sheets-Sheet 1
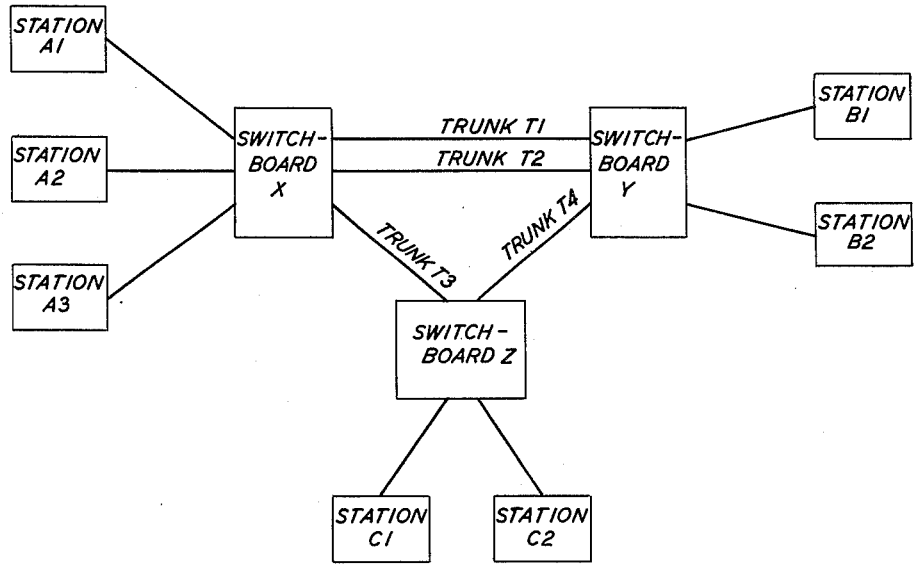
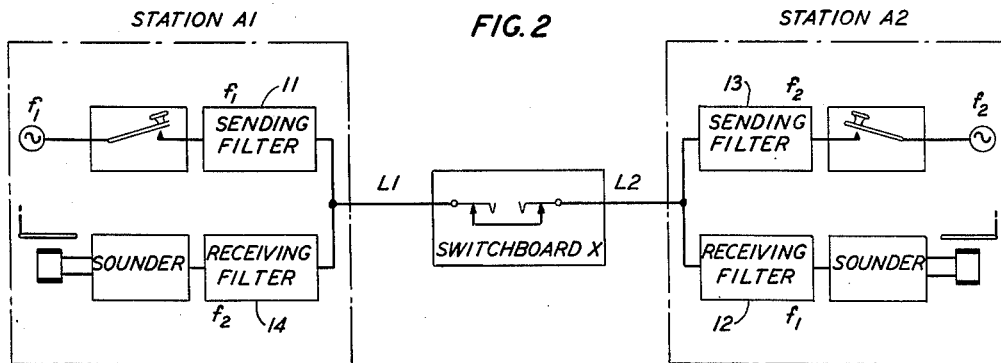
INVENTOR
A. L. MATTE
BY
ATTORNEY Dec. 23, 1952      A. L. MATTE      2,623,123

CARRIER TELEGRAPH SYSTEM

Filed Feb. 10, 1950      5 Sheets-Sheet 2

INVENTOR
A. L. MATTE
BY Hugh S. Wentz
ATTORNEY

Dec. 23, 1952  A. L. MATTE  2,623,123
CARRIER TELEGRAPH SYSTEM
Filed Feb. 10, 1950  5 Sheets-Sheet 3

INVENTOR
*A. L. MATTE*
BY
Hugh S. Wertz
ATTORNEY

Dec. 23, 1952     A. L. MATTE     2,623,123
CARRIER TELEGRAPH SYSTEM
Filed Feb. 10, 1950     5 Sheets-Sheet 4

INVENTOR
A. L. MATTE
BY
ATTORNEY

Dec. 23, 1952  A. L. MATTE  2,623,123
CARRIER TELEGRAPH SYSTEM
Filed Feb. 10, 1950  5 Sheets-Sheet 5
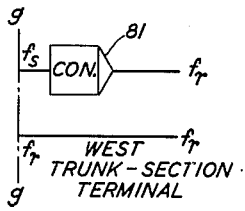
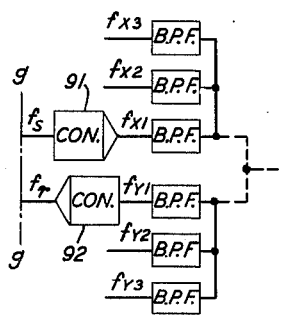
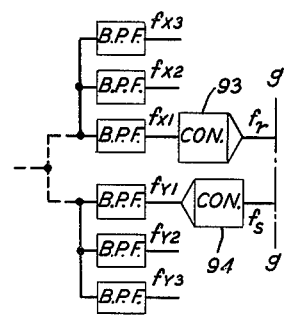
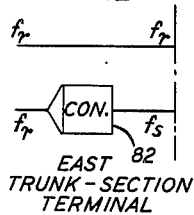
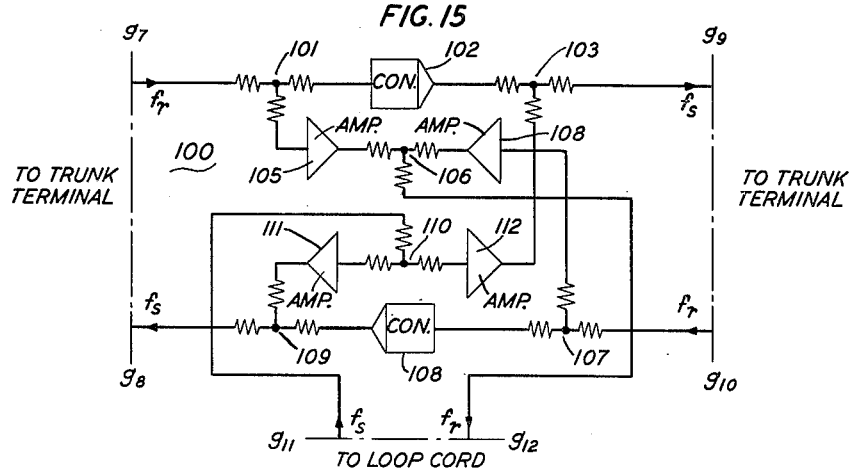
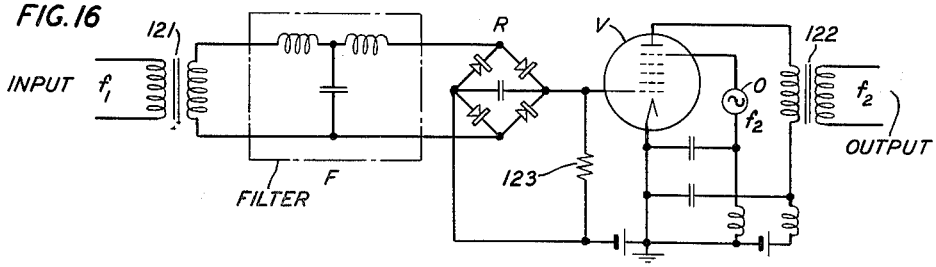
INVENTOR
A. L. MATTE
BY
ATTORNEY Patented Dec. 23, 1952

2,623,123

UNITED STATES PATENT OFFICE 2,623,123

CARRIER TELEGRAPH SYSTEM

Andrew L. Matte, Summit, N. J., assignor to Bell Telephone Laboratories, Incorporated, New York, N. Y., a corporation of New York Application February 10, 1950, Serial No. 143,389

7 Claims. (Cl. 178—66)

This invention relates to carrier telegraph systems and particularly to multipoint operation of such systems where the stations send and receive signals consisting of alternating-current pulses.

The invention is broadly applicable to either single channel or multichannel trunk operation of such systems and equally applicable to amplitude modulation or to frequency shift operation except that in the latter case, two closely associated frequencies are employed, one for spacing and one for marking. Therefore, whenever in this specification the term "frequency" is used, it will be understood that a pair of frequencies is intended if frequency shift operation is contemplated. Moreover, the trunks may be either two or four-wire facilities.

There is a tendency in two-way carrier telegraph systems for the signals transmitted from a given point to appear as spurious received signals at the same point, either at once or after various delays. This near-end cross-talk may occur in any network in which there is coupling between the two directions of transmission due to proximity of the conductors, various unbalances, or actual metallic connections. However, this disturbance is generally most marked in two-wire circuits where the same pair of conductors is employed for the transmission and reception of signals. In half-duplex operation, certain expedients may be employed to desensitize the receiver at a sending station during transmission, but these devices are of a marginal character and of limited effectiveness. Furthermore, they are entirely inapplicable to full-duplex operation, which is precisely the case where cross-talk is most objectionable. For switched service where different circuit conditions of cross-talk prevail from connection to connection, desensitizing methods may be very difficult to administer.

One object of this invention is to minimize near-end cross-talk in such systems.

In accordance with the invention, this deleterious effect is minimized by using different frequencies for sending and receiving, thereby permitting discrimination between transmitted and legitimate received signals by means of filters. A system which uses this expedient will hereinafter be referred to as a "two-frequency system."

Another object of this invention is to make the carrier frequencies used by the interconnected stations of a carrier telegraph system independent of each other.

A further object is to make the carrier frequencies used on a trunk circuit of a carrier telegraph system independent of those employed by the stations connected thereto.

The simplest communication arrangement in such systems consists of two stations connected by a line. It has heretofore been customary to make such an arrangement operable in two-frequency systems by reversing the frequencies used at one station with respect to those used at the other station, i. e., if $f_1$ and $f_2$ are the frequencies used for sending and receiving, respectively, at station A, frequencies $f_2$ and $f_1$ will be respectively employed for these two purposes at station B. Obviously, this expedient cannot be used for three-way transmission and, a fortiori, in still more complex layouts.

Therefore, another object is to facilitate intercommunication between two or more stations connected by a trunk and one or more stations interconnected at any intermediate point therealong. In accordance with the present invention, easier intercommunication between all stations of the telegraph network is made possible including those interconnected to the same point of the trunk.

An important advantage of the present invention is that it makes the equipment at all the stations electrically identical so that identical equipment may be used throughout. This helps eliminate operating confusion and duplication of station equipment.

In a carrier telegraph system in accordance with the invention the above objects are realized by a system in which: each of the telegraph stations uses different sending and receiving carrier frequencies to allow discrimination against near end cross-talk by means of filters; the sending and receiving frequencies, respectively, are the same at all stations; and interconnection of two or more stations in a two-way communication relation over a common line is made possible by automatic frequency conversion by the use of converters at the switching points so that the signals sent out by any station at the sending frequency are converted into signals of the receiving frequency for reception by any other station or stations.

The utility of this invention is predicated on the existence of some or all of the following traffic requirements. Interconnection is required between a number of carrier telegraph stations. In some cases, this may require only connecting together loops which terminate at the same switchboard, but in other cases, two or more switchboards must be interconnected through trunks. Any number of these stations can be connected rapidly together at will at switching points by means of patched connections, and calls can be switched to any one of several trunks, depending on traffic conditions and destination. Also, some of the trunks can be multifrequency carrier telegraph systems over which a number of distinct connections can be set up simultaneously. Moreover, any one station can send to all the other stations simultaneously, and any station in the network can act as a sending station.

The invention will be more readily understood by referring to the following description taken in connection with the accompanying figures forming a part thereof in which:

Figs. 1 through 5 show various typical carrier telegraph systems to which the invention is applicable and include respectively, a network involving three switching points, a two-station system, a two-station system with a trunk interconnection, a two-station system with interconnection through one channel of a multichannel telegraph trunk, and a three-station system with a six-terminal network interconnection;

Figs. 11 and 12 illustrate, respectively, the west and east trunk terminals of the arrangement of Fig. 10 for a single channel four-wire trunk;

Figs. 13 and 14 illustrate, respectively, the west and east trunk terminals of the arrangement shown in Fig. 10 for a multichannel carrier trunk;

Fig. 15 shows the intermediate cord circuit of the arrangement shown in Fig. 10; and Fig. 16 is a circuit diagram of a converter of the kind which can be used in the practice of the invention.

In all these figures except Fig. 16, a single line is used to represent a pair of conductors in a manner well known to the workers in the art.

Referring more specifically to the drawings, Fig. 1 shows in simplified form a typical telegraph network involving three switchboards X, Y and Z. Three stations A1, A2, and A3 and three trunks T1, T2, and T3 are shown connected to a switchboard X, two stations B1 and B2 and three trunks T1, T2 and T4 to a second switchboard Y, and two stations C1 and C2 and two trunks T3 and T4 to a third switchboard Z. The latter may be considered as being either remote from the route followed by trunks T1 and T2 or as being located at an intermediate station on this route.

Fig. 2 shows, in a typical two-frequency system of the prior art, how two carrier telegraph stations, A1 and A2, which utilize a common switchboard X, are interconnected through loops L1 and L2. Station A1 is set to transmit frequency $f_1$, and hence its sending filter 11 must be adapted to pass this frequency. Then since station A2 is to receive this frequency, its receiving filter 12 must similarly be adapted to pass this frequency. On the other hand, station A2 will send at frequency $f_2$, and accordingly its sending filter 13 and the receiving filter 14 at the receiving station A1 must be adapted to pass this latter frequency. Thus, the equipments at the two stations are dissimilar.

Figure 3:
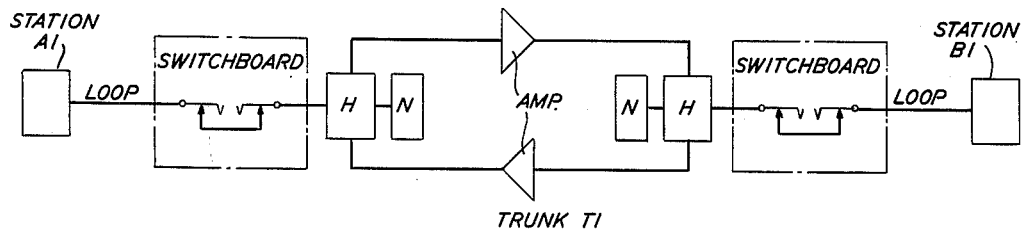

Fig. 3 illustrates a typical interconnection of two stations in a carrier telegraph system by way of a single channel trunk. The station equipment at station A1 and station B1 is identical with that in Fig. 2, but here the two stations are interconnected through the trunk T1. A four-wire trunk terminated on a two-wire basis is shown. A hybrid coil H with a balancing network N is used for each termination.

Figure 4:
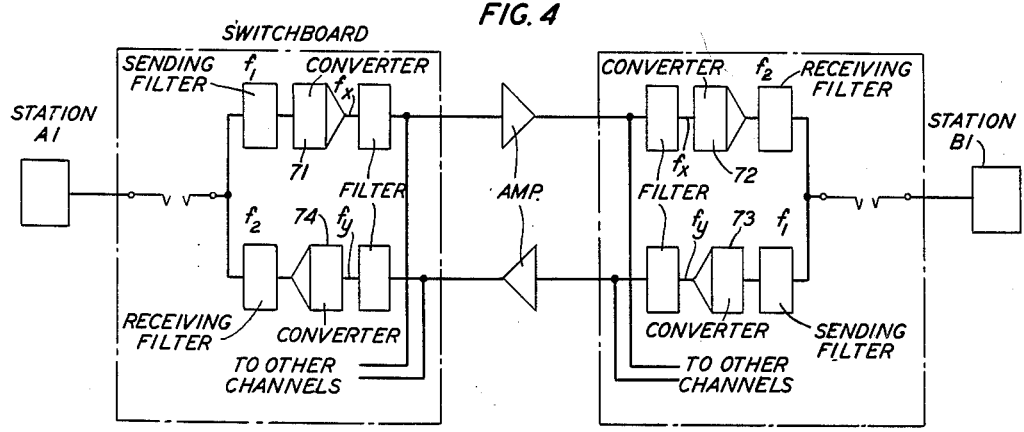

Fig. 4 shows the two carrier stations A1 and B1 connected through one channel of a multichannel telegraph system. The signal of sending frequency $f_1$ of station A1 is transformed by the frequency converter 71 to carrier frequency $f_x$ and transformed by the frequency converter 72 to frequency $f_2$. Similarly, the signal of frequency $f_1$ from station B1 is transformed by converters 73 and 74 respectively to carrier frequency $f_y$ and therefrom to the receiving frequency $f_2$. Here, the terminal equipment need not be dissimilar, since the sending equipment can all be adapted to send at the frequency $f_1$, and the receiving equipment to receive at the frequency $f_2$.

In other cases of point-to-point operation, half-duplex and full-duplex operation require that the sending and receiving frequencies of the two stations be interchanged with respect to one another. However, in a patched system, such as is shown in Fig. 1, this lack of uniformity may lead to some operating and equipment complications. For example, it is evident that if station A1 transmits frequency $f_1$ to other stations A2, B1, C1, etc., these must be equipped to receive this frequency, but when C1 is connected to B1, the sending and receiving frequencies at one of these stations must be reversed. It is a necessary consequence thereof that each station would have to be equipped with at least two carrier sources and means for interchanging the sending or receiving filters thereof, depending on from which station it is receiving. In addition, for frequency shift operation, new complexities are introduced.

Figure 5:
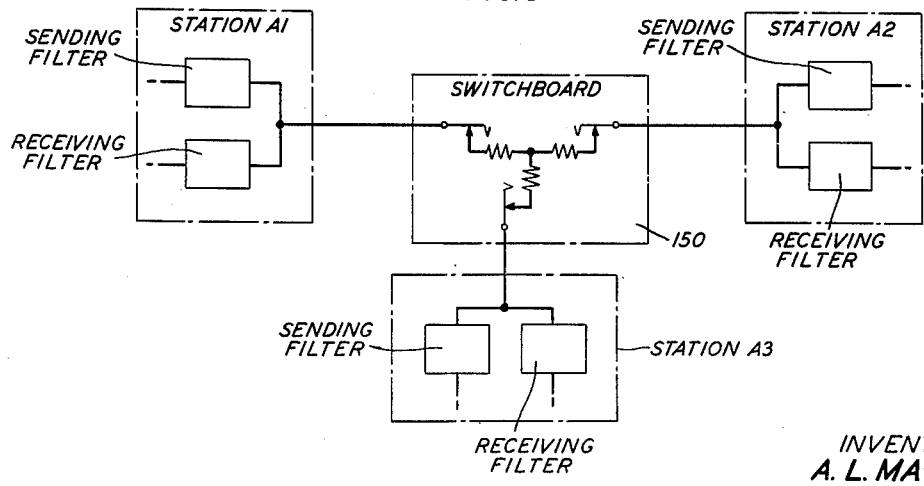

Fig. 5 shows three carrier stations A1, A2 and A3 of a carrier telegraph system connected together through a six-terminal network 150. The simple expedient of assigning different sending and receiving frequencies to the stations in accordance with the arrangement shown in Fig. 2 is no longer possible. A practical solution of the problem must satisfy two conditions. A sending station must be able at all times to receive a "break" signal from any receiving station so that its receiving circuit must always be connected to the loop. Also, a station which is sending must not receive its own signals, otherwise echoes become objectionable.

In accordance with the present invention, it is possible to eliminate the operating confusion and duplication of station equipment which results in attempting to provide point-to-point operation on the above basis and to make connections involving more than two carrier telegraph stations possible when the two-frequency system is employed. The desired ends are achieved by providing certain cord circuits, in accordance with the invention, which permit all stations to use a first frequency for sending which is identical for all stations and a different second frequency for receiving which is likewise similar for all stations.

Figure 6:
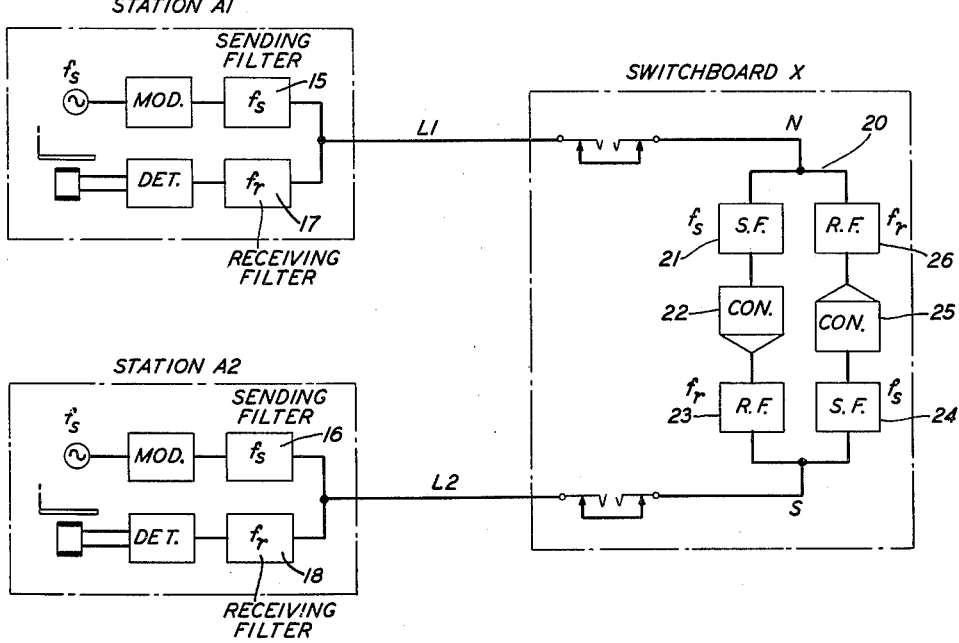
Fig. 6 shows two stations of a carrier telegraph system connected together through a directional network in accordance with the invention.

Fig. 6 illustrates how two stations A1 and A2 of a carrier system, whose loops L1 and L2 terminate at the same switchboard X, can be interconnected in accordance with the invention. The subscribers at stations A1 and A2 have the usual two-frequency terminal equipment as shown in Fig. 2 connected respectively to the loop conductors L1 and L2. However, this equipment is different from that hereinbefore described in that here both send at frequency $f_s$ so that the sending filters 15 and 16 are tuned to this same sending frequency $f_s$, and similarly both receive a frequency $f_r$ so that both receiving filters 17 and 18 are tuned to the identical receiving frequency $f_r$. Conductor loops L1 and L2 are connected through a cord circuit 20 at switchboard X. This circuit 20 consists basically of two paths NS and SN, each unidirectional in the direction of transmission. Each path provides interconnection between the two loops L1 and L2. The first path NS for transmission from station A1 to station A2 consists of the sending filter 21, the converter 22, and the receiving filter 23. Similarly, the second path SN for transmission from station A2 to station A1, consists of an identical sending filter 24, a converter 25, and a receiving filter 19. Hereinafter in the description of the invention, unless otherwise modified, the expression "a sending filter" (shown as "S. F." in the drawings) will be used to describe a filter which selectively passes only the frequency $f_s$ of transmission; similarly, the expression "converter" will be used to describe a unidirectional frequency converter (designated "CON." in drawings) which accepts the transmission frequency signal $f_s$ and reemits it at the receiving frequency $f_r$, and "a receiving filter" (shown as "R. F." in the drawings) will be used to denote a filter selectively passing only the receiving frequency $f_r$. Moreover, it is to be recalled that if frequency shift operation is intended, both the sending and receiving frequencies consist of a pair of frequencies so that both types of filters must selectively pass the pair, and the converter must similarly convert this pair of frequencies. In this case, the designations $f_s$ and $f_r$ will refer similarly to closely spaced pairs of frequencies for sending and receiving, respectively. An illustrative example of a frequency converter, which can be used in the practice of the invention, is hereinafter described with reference to Fig. 16.

The operation of the arrangement of Fig. 6 will now be described. The signal sent at station A1 by its sending equipment as frequency $f_s$ is transmitted by way of loop conductor L1 to the switchboard X and there through the cord circuit 20, where it becomes of receiving frequency $f_r$, and is received thereafter by way of loop conductor L2 by the receiving equipment of station A2. In similar fashion, signals sent from station A2 as frequency $f_s$ are received at station A1 as frequency $f_r$.

Figure 7:
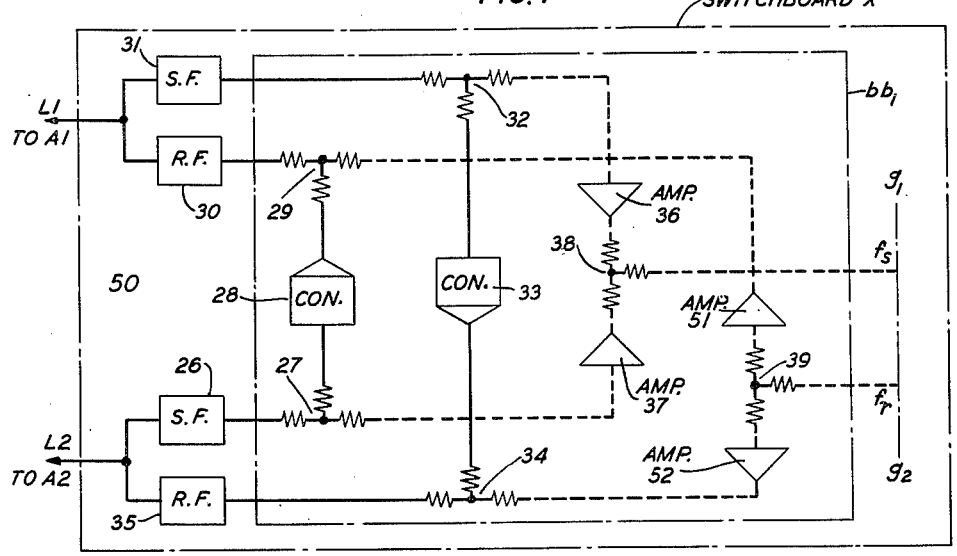
Fig. 7 shows a cord circuit in accordance with the invention for the interconnection of two stations of the above type and includes means for providing additional connections.

Fig. 7 illustrates the cord circuit 50 of such a system which is similar to that for a two-station interconnection as shown in Fig. 6 but which has been modified, in accordance with the invention, to provide a building block $bb_1$ by means of which additional loops can be interconnected. At the switchboard X, the loop conductor L1 from station A1 is connected through the cord circuit 50 to the loop conductor L2. The cord circuit 50 comprises unidirectional paths for each direction of transmission as hereinbefore described and also has provision for interconnection to additional loop or trunk conductors. The forward transmission path from station A1 to station A2 includes the loop L1, the sending filter 31, the six-terminal network 32, the converter 33, the six-terminal network 34, the receiving filter 35, and the loop conductor L2. Similarly, the forward transmission path from station A2 to station A1 includes the loop conductor L2, the sending filter 26, the six-terminal network 27, the converter 28, the six-terminal 29, the receiving filter 30, and the loop conductor L1. This, but for the addition of the six-terminal networks, is identical to the circuit 20 hereinbefore shown in Fig. 6. However, the addition of the dotted portions of Fig. 7 develops a building block $bb_1$ by means of which a plurality of other loops may be interconnected. The third arms of the six-terminal networks 32 and 27 are connected through the isolating unidirectional amplifiers 36 and 37, respectively, to two arms of the six-terminal network 38, and the third arm thereof leads to terminal $g_1$, the first terminal for interconnecting loops or trunks. In similar fashion, the third arms of the six-terminal networks 29 and 34 are connected through isolating amplifiers 51 and 52, respectively, to separate arms of the six-terminal network 39, and the third arm thereof leads to terminal $g_2$, the second terminal for interconnecting loops or trunks, which paths are for incoming signals so that the amplifiers 51 and 52 are made unidirectional in the direction of reception.

Figure 8:
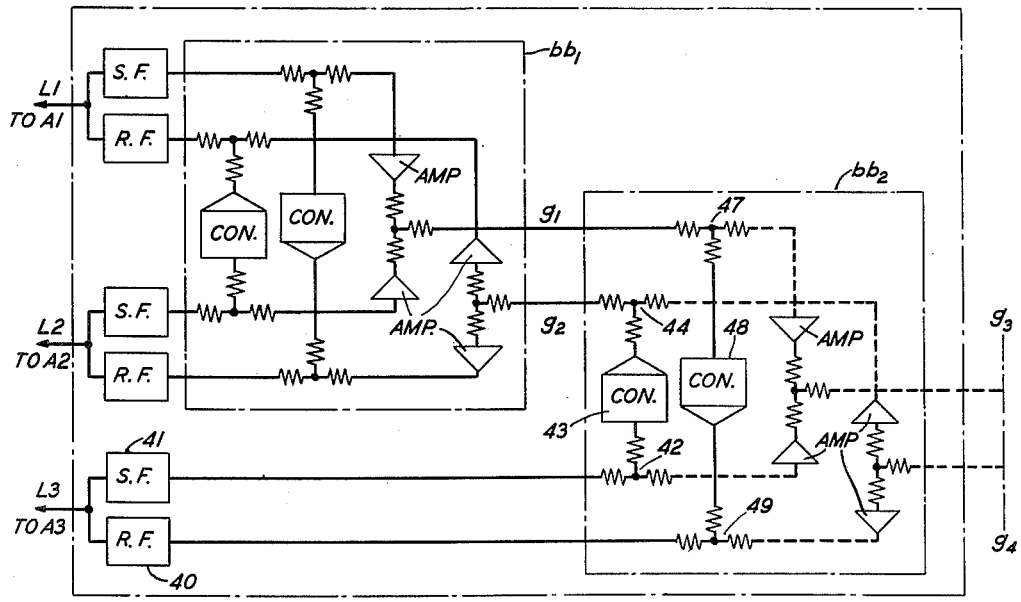
Fig. 8 shows a cord circuit in accordance with the invention for the interconnection of three stations of the above type and includes means for providing additional connections.

Fig. 8 illustrates the use of the additional building block $bb_2$ to provide interconnection in such systems of a third lop conductor L3 for a third station A3 in accordance with the invention. The reception path to station A3 is made from the terminal $g_1$, as hereinbefore described with regard to Fig. 7, through two arms of the six-terminal networks 47, the converting means 48, two arms of the six-terminal network 49, and the receiving filter 40 to the loop conductor L3. The transmission path from station A3 includes the loop conductor L3, the sending filter 41, two arms of the six-terminal network 42, the converting means 43, the six-terminal network 44 and connection to terminal $g_2$ which as hereinbefore described provides interconnection with stations A1 and A2. Moreover, the third arms of the six-terminal networks 47 and 42 combine with the dotted portion to form an additional building block $bb_2$ which provides terminals $g_3$ and $g_4$ for additional interconnection as may be desired. It is to be understood, that in each case, the dotted parts of the circuits are to be left out, as well as the six-terminal networks to which they connect, if connection to additional building blocks is not desired. An alternative would be to retain the dotted portions and terminate each of the two pairs of the connecting terminals in the characteristic impedances of the six-terminal networks. It is to be remembered that in these figures, a single line represents a pair of conductors, so that each of the terminals, represents a pair of terminals. The six-terminal networks are used merely to preserve impedance relations in three-way connections, so that they become superfluous when two-way connections only are desired.

Figure 9:
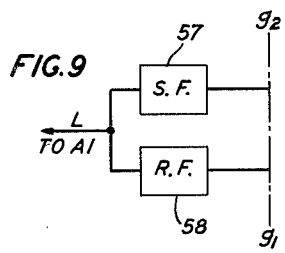
Fig. 9 shows how a single carrier telegraph station may be connected to a trunk in accordance with the invention.

Fig. 9 illustrates the connection for a single loop in such a system when no further interconnection is desired. The terminals $g_1$ and $g_2$ are connected through a receiving filter 53 and sending filter 57, respectively, to the loop conductor L3.

Figure 10:
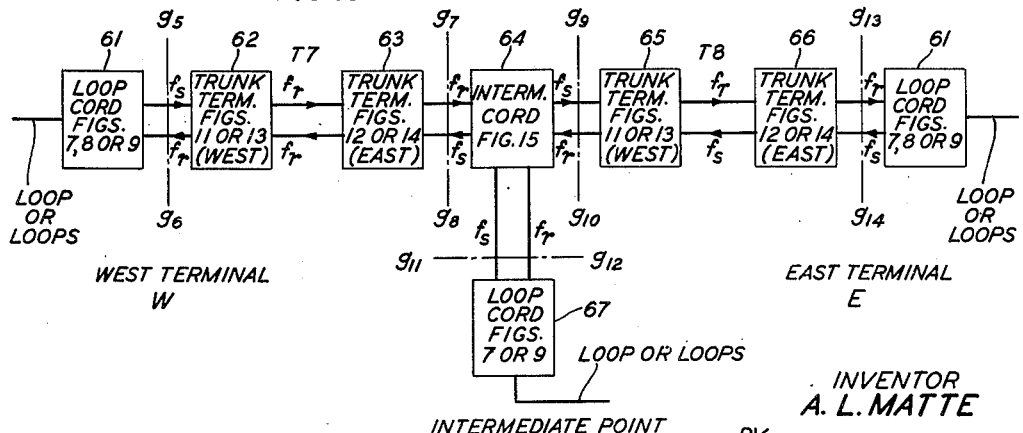
Fig. 10 is an illustrative schematic in block diagram form of a two-section four-wire trunk with carrier telegraph stations connected to each terminal and to an intermediate point in another embodiment of the invention.

Fig. 10 is an illustrative embodiment in block schematic form of a two-section four-wire trunk, in accordance with the invention, with carrier stations connected to each terminal and to an intermediate point. At the west terminal W, the desired loops are interconnected through the loop-cord 61, hereinbefore described with reference to Figs. 7, 8 and 9, the relevant figure being determined in a particular case by the number of loops to be interconnected. At the interconnecting terminals $g_5$ and $g_6$, connection is made to the west trunk-terminal 62 hereinafter to be described, which connects through the trunk T7 to the east trunk-terminal 63, also to be described. This is further connected by way of the interconnecting terminals $g_7$ and $g_8$ to the intermediate cord 64, to be described, which is provided with interconnecting terminals $g_9$ and $g_{10}$ for interconnection with the west trunk-terminal 65 of trunk T8, and with terminals $g_{11}$ and $g_{12}$ for interconnection to the loop-cord 67 and thence to intermediate station-loops. As before, the west trunk-terminal 65 of trunk T8 connects therethrough to the east trunk-terminal 66 thereof which connects to the interconnecting terminals $g_{13}$ and $g_{14}$ of the loop-cord 61 of the east terminal E.

Fig. 11 illustrates diagrammatically the make-up of the west trunk-terminals 62 and 65 of the arrangement of Fig. 10 for a single channel four-wire trunk. There is included therein a converter 81 for transforming the sending frequency from the west direction $f_s$ to the receiving frequency $f_r$.

Fig. 12 similarly illustrates the makeup of the east trunk-terminals 63 and 66 of the arrangement of Fig. 10 for a single channel four-wire trunk. This includes a converter 82 for transforming the sending frequency $f_s$ from the east direction to the receiving frequency $f_r$.

Fig. 13 illustrates the arrangement at the west trunk terminals 62 and 65 of the arrangement of Fig. 10 for a multichannel carrier four-wire trunk. By way of illustration, three channels are shown, but the number of channels is only limited by the usual considerations applying to carrier telegraphy. The loop sending-frequency $f_s$ from the west terminal is transformed by the converter 91 to the trunk carrier-frequency $f_{x1}$ and the trunk carrier-frequency $f_{y1}$ transmitted from the east terminals 63 or 66 is converted to the loop receiving-frequency $f_r$ by the converter 92. Band-pass filters are used in the conventional manner for channel discrimination. Moreover, by the addition of the dotted portion this network becomes adaptable as a single channel two-wire trunk terminal, since a single channel two-wire trunk is the electrical equivalent of a multichannel system in which only one channel is used, provided that the carrier frequency $f_{x1}$ differs from the carrier frequency $f_{y1}$.

Fig. 14 similarly illustrates the arrangement at the east trunk-terminals 63 and 66 of the arrangement of Fig. 10 for a multi-channel carrier system, which can also be adapted, as hereinbefore described, by the addition of the dotted portions for a single-channel two-wire trunk-terminal. The trunk carrier-frequency $f_{x1}$ transmitted from the west terminal 62 or 65 is transformed to the loop-receiving frequency $f_r$ by the converter 93, and the sending loop frequency $f_s$ is converted to the trunk carrier-frequency $f_{y1}$ by the converter 94.

Fig. 15 shows, for purposes of illustration, a cord circuit 100 in accordance with the invention, which can be used at an intermediate point as a bridging element to interconnect a loop-cord thereof and two-trunk-terminals at a four-wire point and is shown as 64 in the arrangement of Fig. 10. It is similar to the loop cord 50 shown in Figure 7, differing in that the converters herein transform the receiving frequency $f_r$ to the sending frequency $f_s$ instead of the opposite, as was characteristic of the loop cords hereinbefore described. This reversal in the converters, though not essential, leads to certain economies in equipment at the intermediate point. The signal from the west trunk T7 is supplied at the receiving frequency $f_r$ from the east trunk-terminal 63 thereof to the interconnecting terminal $g_7$, and a portion thereof is supplied through the six-terminal network 101, the converter 102 wherein it is transformed to the sending frequency $f_s$, and the six-terminal network 103 to the interconnecting terminal $g_9$ of the west trunk-terminal 65 of the east trunk T8. The signal is also sent through the six-terminal network 101, the unidirectional amplifier 105, and the six-terminal network 106, to the interconnecting terminal $g_{12}$ of the intermediate loop-cord 67. Similarly, the signal from the east trunk T8 is received at the receiving frequency $f_r$ from the west trunk-terminal 65 thereof at the interconnecting terminal $g_{10}$, and a portion thereof is supplied through the six-terminal network 107, the converter 108 which converts the receiving-frequency $f_r$ to the sending-frequency $f_s$ and the six-terminal network 109 to the interconnecting terminal $g_8$ of the east trunk-terminal 63 of the west trunk T7. Again, a portion of the signal is sent through the six-terminal network 107, the unidirectional amplifier 108, and the six-terminal network 106 to the interconnecting terminal $g_{12}$ of the intermediate loop-cord 67. The signal from the intermediate loop-cord 67 is supplied at the sending frequency $f_s$ from the interconnecting terminal $g_{11}$ thereof to the six-terminal network 110, the unidirectional amplifier 111, and the six-terminal network 109 to the interconnecting terminals $g_8$ of the east trunk-terminal 63 of the west trunk T7. Similarly, from the six-terminal network 110, a portion of the signal is supplied through the unidirectional amplifier 112 and the six-terminal network 103 to the interconnecting terminal $g_9$ of the west trunk-terminal 65 of the east trunk T8.

Now referring back to Fig. 10 for a description of the operation of the over-all system. At the west terminal W, the signal is transmitted by way of the loop-cord at the sending frequency $f_s$, which is converted at the west trunk-terminal 62 to the receiving frequency $f_r$, or in the case of a two-wire circuit or multichannel system to the trunk carrier-frequency $f_{x1}$, then along the trunk T7 to the east trunk-terminal 63 thereof and subsequently to the intermediate cord circuit 64, therefrom to be supplied both for transmission by way of trunk T8 to the east terminal E, and by way of the loop cord circuit 67 to the intermediate station. Operation from either the east terminal E or the intermediate station is similar. Although Fig. 10 illustrates the interconnection of a single intermediate point, it is evident that additional such points may similarly be interconnected or that branch trunks with associated loops may be similarly derived.

Fig. 16 is the circuit diagram of an illustrative embodiment of a frequency converter for use in the practice of the invention. The input signal of frequency $f_1$ is supplied by means of the input transformer 121 to a filter F, which selectively passes only the frequency $f_1$. The output of the filter F is then rectified by the full-wave rectifier R and a direct voltage is developed on the resistance 123. This resistance 123 is in the first control-grid circuit of a multigrid electron discharge device of the kind well known in the radio field. To a second control grid thereof is supplied a second frequency $f_2$ by an oscillator O. The device is operated so that a signal of frequency $f_1$ supplied by the transformer 121 develops a direct voltage across resistance 123 which modifies the bias of the first control grid in a way to make the device conduct current to the anode thereof, and the output voltage on the anode of the device varies with the frequency $f_2$ supplied to the second control grid. Thus, an output signal of frequency $f_2$ is developed across the output transformer 122 which has the same envelope as the input signal of frequency $f_1$.

It is to be understood that the above-described arrangements are illustrative of the application of the principles of the invention. Numerous other arrangements may be devised by those skilled in the art without departing from the spirit and scope of the invention.

What is claimed is:

1. A carrier telegraph system comprising a plurality of two-way telegraph stations connected to a common switching point, each such station employing a first sending carrier frequency and a different second receiving carrier frequency, the first sending frequency being identical for all stations, and the second receiving frequency being identical for all stations, means associated with said switching point for automatically transforming the first sending carrier frequency of signals from any station to the second receiving carrier frequency so that these signals can be received by any other station.

2. A carrier telegraph system according to claim 1 in which the said transforming means at the switching point includes a filter selectively passing the sending frequency, converting means for automatically transforming the sending frequency to the different receiving frequency, and in series with said converting means a filter for selectively passing the receiving frequency.

3. A carrier telegraph system comprising a plurality of switching points, trunks interconnecting said switching points, a plurality of two-way telegraph stations connected to each switching point, each station employing a first sending and a different second receiving carrier frequency, the first sending frequency being identical for all stations, and the second receiving frequency being identical for all stations, and means at the switching point for automatically transforming the sending carrier frequency of signals received at each switching point for transmission over the trunk in either direction so that the signals sent out from any station can be received by any other station.

4. In a multichannel carrier telegraph system, a plurality of switching points, a multichannel trunk line, means for interconnecting said switching points over individual frequency channels of said line, a plurality of two-way carrier stations connected to each switching point, each station employing a first sending carrier frequency and a different second receiving carrier frequency, the first sending frequency being identical for all stations, and the second receiving frequency being identical for all stations, and means at each switching point for converting the sending frequency of incoming signals to the channel frequency for transmission and for converting the channel frequency of outgoing signals to the receiving frequency for reception.

5. In a signaling system, a plurality of stations, sending equipment at each station for sending at a first carrier frequency, receiving equipment at each station for receiving at a different second carrier frequency, the first sending frequency being identical for all stations, and the second receiving frequency being identical for all stations, means for interconnecting the sending equipment of any of said stations with the receiving equipment of any number of other stations, and means included in the interconnecting means for transforming the first sending frequency to the second receiving frequency.

6. In a frequency shift signaling system, a plurality of stations, sending equipment at each station for sending at a first pair of carrier frequencies, receiving equipment at each station for receiving at a different pair of carrier frequencies, all stations employing the same first pair for sending and the same second pair for receiving, means for interconnecting the sending equipment of any of said stations with the receiving equipment of any number of other stations, and means included in the interconnecting means for transforming the first pair of frequencies to the second pair of frequencies.

7. In a carrier telegraph network, a plurality of switching points, trunks interconnecting said switching points, a plurality of two-way stations connected to each switching point, each of said stations employing a first sending carrier and a different second receiving carrier frequency, all of said stations employing the same first sending and the same second receiving carrier frequencies, and means at the switching points for converting the sending frequency and the receiving frequency to the receiving and the sending frequencies, respectively, for permitting any one of said switching points to receive signals from any one of said stations and to send to all other stations.

ANDREW L. MATTE.

REFERENCES CITED

The following references are of record in the file of this patent:

UNITED STATES PATENTS

| Number | Name | Date |
|---|---|---|
| 1,581,576 | Horton | Apr. 20, 1926 |
| 1,779,492 | Rea | Oct. 28, 1930 |
| 1,779,500 | Shanck | Oct. 28, 1930 |
| 2,449,391 | Kogane | Sept. 14, 1948 |
| 2,503,000 | Shanck | Apr. 4, 1950 |
| 2,584,259 | Crane | Feb. 5, 1952 |